March 16, 1965  T. R. STOCKTON  3,173,312
VARIABLE SPEED DRIVE MECHANISM
Filed Dec. 31, 1962
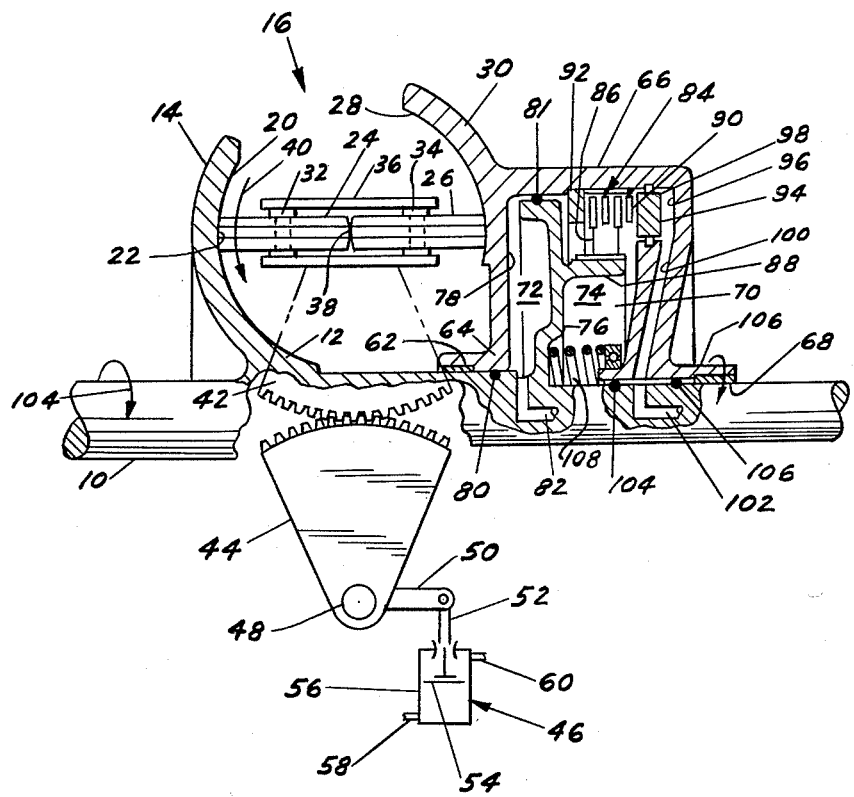
INVENTOR.
THOMAS R. STOCKTON
BY John R. Faulkner
Robert E. McCollum
ATTORNEYS United States Patent Office 3,173,312
Patented Mar. 16, 1965

3,173,312
VARIABLE SPEED DRIVE MECHANISM
Thomas R. Stockton, Northville, Mich., assignor to Ford Motor Company, Dearborn, Mich., a corporation of Delaware
Filed Dec. 31, 1962, Ser. No. 248,336
4 Claims. (Cl. 74—796)

This invention relates to a torque transmitting mechanism, and more particularly to a variable speed friction roller drive mechanism having a direct drive lockup means.

It is an object of the invention to provide an infinitely variable speed friction drive transmission having means to relieve the thrust loads on the friction elements when the transmission is conditioned for a one-to-one drive ratio between its power input and output shafts.

It is a further object of the invention to provide a variable speed friction drive transmission with clutch means to lock up the power input and output shafts for a direct drive therebetween upon the attainment of a one-to-one drive ratio in the variable speed mechanism.

It is also an object of the invention to provide an infinitely variable speed friction drive transmission having a number of interengaged roller elements loaded into contact with drive and driven torus members by fluid pressure means, the axial thrust forces on the roller elements being relieved by additional fluid pressure actuated means upon the attainment of a one-to-one drive ratio through the transmission.

A still further object of the invention is to provide a variable speed friction drive transmission having an infinite number of speed ratio changes between an underdrive and a direct drive of a power output shaft from a power input shaft, the attainment of a direct drive effecting the engagement of a clutch to positively connect the shafts together and relieve the friction drive of axial thrust loads thereon.

Other objects, features and advantages of the invention will become apparent upon reference to the succeeding detailed description thereof, and to the drawing illustrating the preferred embodiment thereof, wherein the figure shows schematically one-half of a friction drive device embodying the invention.

The figure shows an input shaft 10, which is adapted to be driven from a source of power, not shown, such as the internal combustion engine for a motor vehicle. The shaft is formed integral with the hub 12 of a driving torus member 14 of a variable speed friction roller drive mechanism 16. The driving member has an internal friction face or surface 20 generated by the rotation of a substantially semi-circular line about the axis of shaft 10. The surface is engaged or contacted by the peripheral friction surface 22 of a roller element or wheel 24 extending in a plane perpendicular to the face. The roller element is one of a pair of radially aligned and engaged roller elements, the other roller element 26 drivingly contacting the friction face 28 of a driven torus member 30.

The roller elements are rotatably mounted on pinion shafts 32 and 34 secured in a common stationary carrier member 36. The carrier is tiltable about a fixed axis 38 perpendicular to the plane of the figure and coinciding with the center of the torus defined by the two halves of the drive and driven members. The tilting varies the speed ratio between the members between an underdrive and a direct drive ratio. That is, since the linear velocity of each point on both the torus member surfaces varies in proportion to the radial distance of the point from the torus axis of rotation, and the roller elements contact diametrically opposite points on the members, the speed of the driven torus 30 will be in inverse proportion to the change in speed of the roller element 24 as the carrier tilts to change the point of contact of the roller 24 with the surface 20. Therefore, in the position shown, and except for slip losses, the speeds of the drive and driven torus members are the same since the diametrically opposite contact points are at the same radius. Progressive tilting movement of carrier 36 counterclockwise in the direction of arrow 40 will therefore progressively decrease the speed of torus member 30 with respect to the speed of shaft 10, while clockwise tilting movement will increase the speed of torus member 30.

The carrier is tiltable by a pair of interengaged segment gear members 42 and 44 actuated by a servo 46. The gear 42 is fixed to the axis of carrier 36, while gear 44 is fixed to a shaft 48 having a lever 50 fixed for rotation with it. The lever in turn is pivoted to the rod 52 of a fluid pressure operated piston 54 movable in opposite directions in a cylinder 56 upon alternate supply of fluid through lines 58 and 60.

Thus, clockwise actuation of gear 44 by servo 46 rotates carrier 36 counterclockwise to underdrive torus 30 with respect to the speed of torus 14, while clockwise rotation of gear 44 increases the speed of torus member 30 towards a one-to-one drive.

Driven torus member 30 is rotatably and axially slidably mounted on drive shaft 10 by means of a bushing 62 pressed into the torus hub 64 or otherwise secured to it. The torus also has a drum-like axial extension 66 rotatably and slidably mounted on drive shaft 10 by a bushing 68. The extension and main torus portion together with shaft 10 define a chamber 70, which is divided into two compartments 72 and 74 by an annular flange 76 projecting from the drive shaft 10. Compartment 72 is adapted to be filled with a fluid under pressure to act against the back 78 of the driven torus to load it and the roller elements into an operational frictional engagement with a driving torus 14. The compartment is sealed at opposite radial portions by suitable ring seals 80 and 81, and receives fluid under pressure from a bore 82 in shaft 10.

The drive and driven torus members 14 and 30 can be directly connected to each other by a friction clutch 84 when the friction drive device 16 is conditioned for a one-to-one drive ratio, as shown. This not only provides a more efficient operation by elimination of slip losses, but also relieves the axial thrust loads on the roller elements, thereby reducing wear. The clutch is of the fluid pressure actuated type having a pair of annular friction discs 86 slidably splined to an axial extension 88 of drive shaft flange 76, and interleaved with a pair of similar friction discs 90 slidably splined to the driven torus drum extension 66. The discs 90 are positioned between a backing member 92 and a piston 94 sealingly and slidably mounted in a recess 96 in extension 66. The clutch is engaged upon admission of fluid to the chamber 98 through bores 100 and 102 in the extension and drive shaft, respectively. Ring seals 104 and 106 prevent a leak of fluid into chamber 74 or past bushing 68. The clutch discs are moved to a clutch disengaged position by suitable spring means 108 upon the release of fluid from chamber 98.

In operation, with drive shaft 10 rotating, but no fluid being supplied to either piston chamber 98 or loading chamber 72, no drive is transmitted between the torus members, since any frictional rolling contact of the element 26 on the driven torus member 30 will merely slide it towards the right of the position shown.

To start the driven torus in motion, servo 46 is actuated to tilt carrier 36 to a position providing the lowest underdrive condition of operation. Fluid under pressure is then supplied to chamber 72 through bore 82 to react against the stationary flange 76 and load torus 30 and the roller elements 24 and 26 into contact with torus 14 to be driven thereby. Clockwise rotation of input shaft 10 in the direction of arrow 104 therefore effects a counterclockwise drive of roller 24 and clockwise drive of roller 26 to drive torus 30 in the same direction as shaft 10 but at a reduced speed.

Progressive adjustment of the carrier clockwise by servo 46 to the one-to-one drive ratio position shown will progressively increase the speed of torus member 30 until it is rotating at the speed of input shaft 10. At this time, fluid is supplied to piston chamber 98 to engage clutch 84, thereby directly connecting input shaft 10 to the drum extension 66 of torus 30 and bypassing the friction drive 16. In timed relationship, the fluid in loading chamber 72 is vented thereby relieving the roller elements of the axial thrust forces normally acting on them. The engagement of the clutch therefore eliminates the slip losses in the drive device 16, thereby increasing the operational efficiency and prolonging the wear life of the roller elements and friction surfaces.

It is to be noted that while the surface 28 of driven torus 30 is terminated short of its hub, it could be continued to the hub so as to permit a tilting of the carrier to a position providing an overdrive of torus member 30 with respect to the speed of shaft 10.

While the invention has been illustrated in its preferred embodiment in the figure, it will be clear to those skilled in the arts to which the invention pertains that many changes and modifications may be made thereto without departing from the scope of the invention.

I claim:

1. A friction drive transmission having axially spaced drive and driven torus members rotatable about a common axis, a plurality of interengaged roller elements between and frictionally engaging said members for transmitting an infinite number of drives therebetween in the same direction of rotation, releasable means loading said members and elements together, means for adjusting the position of said roller elements for varying the drive ratio between said members, and clutch means for connecting said members, the engagement of said clutch means and release of said releasable means providing a direct drive between said members and relieving the loading thereon.

2. A friction drive infinitely variable transmission having axially spaced semi-toroidal drive and driven members facing each other and rotatable about a common axis, a plurality of interengaged roller elements between and frictionally engaging said members for transmitting a plurality of drives therebetween in the same direction of rotation, fluid pressure means loading said members and elements together, means for adjusting the position of said roller elements for varying the drive ratio between said members, and direct drive lock-up clutch means between said members the engagement of said clutch means upon the movement of said roller elements to a position providing a drive of said members at the same speeds, and the release of said fluid pressure means, providing a lock-up between said members and relieving of the loading on the members.

3. An infinitely variable friction drive transmission having axially spaced semi-toroidal drive and driven torus members rotatable about a common axis and separated by and engaged with a plurality of interengaged roller elements transmitting a drive therebetween in the same direction of rotation, said elements being mounted for a tilting movement about an axis around said common axis, means together with said driven member forming a fluid pressure chamber, the introduction of fluid under pressure in said chamber loading said members and elements together, gear means for tilting said roller elements for varying the drive ratio between said members, and clutch means between said members engageable to provide a direct drive therebetween permitting relief of the loading on said members by exhaust of fluid from said chamber.

4. An infinitely variable friction drive transmission having axially spaced semi-toroidal drive and driven members rotatable about a common axis, a plurality of interengaged roller elements between and frictionally engaging said members for transmitting a drive therebetween in the same direction of rotation, said elements being mounted for a tilting movement as a unit about an axis around said common axis, the engagement and rotation of said members and elements creating axial thrust forces on said elements, said axial forces being opposed by fluid pressure means acting against one of said members, means for tilting said roller elements for varying the drive ratio between said members, and fluid pressure actuated clutch means between said members engageable to provide a direct drive therebetween, the engagement of said clutch means permitting relieving the axial forces on said elements by release of the fluid pressure means acting thereagainst.

References Cited in the file of this patent

UNITED STATES PATENTS

| | | |
|---|---|---|
| 2,157,065 | Madle | May 2, 1939 |
| 2,583,790 | Mikina | Jan. 29, 1952 |